United States Patent [19]

Vatter et al.

[11] Patent Number: 4,702,330

[45] Date of Patent: Oct. 27, 1987

[54] HYDRAULIC BRAKING AND STEERING BRAKE SYSTEM

[75] Inventors: Waldemar Vatter, Laubach; Franz Exner, Muehlheim, both of Fed. Rep. of Germany

[73] Assignee: ITT Industries, Inc., New York, N.Y.

[21] Appl. No.: 609,767

[22] Filed: May 14, 1984

[30] Foreign Application Priority Data

May 14, 1983 [DE] Fed. Rep. of Germany ....... 3317611

[51] Int. Cl.$^4$ .............................................. B60K 17/30
[52] U.S. Cl. .................................... 180/6.2; 180/6.24
[58] Field of Search ............................... 180/6.2, 6.24

[56] References Cited

U.S. PATENT DOCUMENTS

| | | | |
|---|---|---|---|
| 2,366,310 | 1/1945 | Boldt | 180/6.2 |
| 2,791,167 | 5/1957 | Lockmiller | 180/6.2 |
| 2,911,168 | 11/1959 | Moreland | 180/6.2 |
| 3,154,164 | 10/1964 | Shaw et al. | 180/6.24 |
| 3,400,788 | 9/1968 | Brace | 180/6.2 |
| 3,459,458 | 8/1969 | Green et al. | 180/6.2 |
| 3,863,991 | 2/1975 | Wilson | 180/6.2 |
| 4,078,384 | 3/1978 | Shutt | 60/591 |
| 4,265,491 | 5/1981 | Shutt | 303/84 A |
| 4,457,562 | 7/1984 | Pickenhahn | 180/6.2 |
| 4,547,967 | 10/1985 | Reynolds et al. | 180/6.2 |

Primary Examiner—Samuel Scott
Assistant Examiner—H. A. Odar
Attorney, Agent, or Firm—James B. Raden; Robert P. Seitter

[57] ABSTRACT

The braking and steering brake system of the present invention comprises two master cylinders, operable singly or jointly via brake pedals, with the master cylinders having a primary and a secondary piston each operating in a bore. The primary pressure chambers formed by the pistons are connected to the rear wheel brakes of a vehicle. The secondary pressure chambers are interconnected via a pressure fluid line in any state of operation. The primary pressure chambers via a valve arrangement and pressure medium line are interconnected in both the release position and in the braking position. The brakes of the non-steering-braked front axle are connected to the pressure fluid line. In a steering brake position, through a compression spring, one of the two valve arrangements closes so that only the steered-braked brake is supplied with pressure medium.

17 Claims, 4 Drawing Figures

HYDRAULIC BRAKING AND STEERING BRAKE SYSTEM

BACKGROUND OF THE INVENTION

The present invention is concerned with a hydraulic braking and steering brake system, especially for use with farm tractors, comprising two master cylinders operable singly or jointly by a brake pedal. Each master cylinder has primary and a secondary piston operating in a bore. The secondary piston together with the primary piston and the bore form the primary pressure chamber and, with the closed end of the bore, form the secondary pressure chamber. When the primary and secondary pressure chambers are in the release position via channels closeable upon actuation of the primary and secondary pistons, closing elements are connected to an equalizing chamber. The secondary pressure chambers are interconnected through an equalizing line and the primary pressure chambers are connected to steer-brakeable brakes on wheels at opposite sides of the vehicle. A valve arrangement respectively interconnects the two primary pressure chambers in the event that the two master cylinders are actuated simultaneously, separating them in the event that only one of the master cylinders is actuated.

A hydraulic brake and steering brake system of this type has already been described in the prior German Patent Application No.(P33 05 856). In the braking system according to the reference are two tandem master cylinders that can be operated singly or jointly, with each of the tandem master cylinders being provided with a primary pressure chamber and a secondary pressure chamber. Connected to the primary pressure chamber of each master cylinder is a wheel brake of a steer-brakeable vehicle axle, preferably the rear axle of a vehicle. The secondary pressure chambers are interconnected via an equalizing line in each operational condition of the brake system. Provided on the equalizing line is a change-over valve operable by the pressure of the secondary pressure chambers. This valve, in the release and steer-brake position through its resting position, hydraulically separates the steer-braked wheel brakes. In the brake position, through actuation thereof, the valve interconnects the same steer-braked wheel brakes.

Actuation of the change-over valve will be performed only in the braking position as the two secondary pistons are then actuated at the same time, with the secondary pressure chambers being sealed in pressure-tight manner after traversing the channels and breather bores, respectively. Pressure can now build up in the secondary pressure chambers and in the equalizing line, that will act upon the actuating piston of the change-over valve.

As in the steer-brake position, only one master cylinder will be operated. The secondary pressure chamber of that master cylinder will be sealed in pressure-tight manner, however, no further pressure can build up in the secondary pressure chamber since, upon a further displacement of the piston, the volume of the displaced brake fluid will be displaced via the equalizing line, the secondary pressure chamber and the breather bore of the non-operated master cylinder toward the equalizing reservoir.

In the valve piston of the change-over valve there is a channel connected to the equalizing line, in which channel is disposed a valve closeable in the direction of the wheel cylinder pressure chambers of the front wheel brakes.

Valve closure is required in order to permit, on the one hand, in the braking position, a displacement of the change-over valve piston and, on the other hand, in the release position thereof, a pressure balance from the reservoir to the front wheel brakes.

The disadvantages of the reference braking and steering brake assembly lie in the relatively complex construction of the change-over valve arrangement and the fact that in each vehicle braking operation occurrence of which is far more frequent than a steering brake operation, the change-over valve will have to be hydraulically activated., Accordingly, in each braking operation, due to an increase in volume through displacement of the change-over valve, extended braking pedal paths will have to be accepted. As the change-over valve, as a result of a permanent actuation is subject to increased wear, the frequency of failure of a braking system is liable to increase thereby.

SUMMARY OF THE INVENTION

It is, therefore, an object of the present invention to provide a hydraulic brake and steering brake system for vehicles of the afore-mentioned type that is simple in construction and that incrases the operational safety of the vehicle.

In accordance with the invention, this object is achieved in that the steer-braked brakes and the primary pressure spaces are in permanent communication with one another and that the valve arrangement comprises two valves of which respectively one is disposed between the primary and secondary pistons of a master cylinder. Both, in the release position and in the braking position, where both master cylinders occupy an almost indentical position, a pressure medium connection among the primary pressure chambers is established by the valves. In the steer-brake position where only one master cylinder is operated, the actuated valve closes the connection of the associated primary pressure chamber to the other primary pressure chamber of said other master cylinder in a pressure-tight manner. The invention provides a brake and steer brake system wherein, in the releasing position and in the braking position, all brakes are in permanent communication via the pressure medium. Due to the pressure balance, identical pressures are simultaneously developed and relieved, respectively, on all brakes thereby attaining a uniform braking action on the vehicle. Due to the volume equalization of all brakes via the master cylinders of the invention, in the release position of the pedal brake, e.g. as a result of superheated brakes, no pressure can build up thereon that would result in an undersired braking action and, hence, in increased wear, power consumption and temperature increase. Moreover, with the cooling down of the brake fluid from a high temperature, no vacuum can arise in the front axle brake circuit. The occurrence of the vacuum would cause the pistons of the brakes to be retracted thereby requiring an excessively large pedal travel in the next braking operation. By incorporating the control valves into the master cylinder, a simpler method of construction of the brake assembly is produced. Despite integration of the control valves into the master cylinders, the valve arrangements required for the steer-braking operation are not moved during a braking operation thereby extending the life of the master cylinders as compared to conventional master cylinders. As the secondary pressure chambers merely serve for the control of the two valve assemblies, the volume employed will be very low. This will result in shortest possible pedal travels even in the event of a steer-braking operation.

In the case of vehicles having in addition to the steer-braked brakes further non-steer-braked brakes, as is, for example, the case with the front axle of heavy farm tractors, it will be possible for such non-steer-braked brakes to be coupled, in accordance with the invention, to the pressure medium line interconnecting the two primary pressure spaces. This will increase the brake effect and, hence, the safety of a vehicle without affecting the steer-braking operation. However, also it will be possible to couple the non-steer-braked brake circuit to another brake circuit of brakes of the steer-braked wheels. Thus, the brake circuit on the front axle of a vehicle can be elminated while braking is nevertheless performed with a double braking force applied to the rear axle.

In trailer operation of vehicles it is possible for a trailer brake valve to be connected to the equalizing lead interconnecting the two secondary pressure spaces. As such a trailer brake valve only serves to actuate the brake system of the trailer thus requiring only a low volume increase to the control point thereof; the main pedal travels of the master cylinders are only slightly extended thereby.

In order to attain safe closure of the valves in a steer-braking operation for separating the pressure spaces of the non-steer-braked brakes from the primary pressure spaces, it is of special advantage to provide in each primary pressure space a compression spring associated with the primary piston, which compression spring is in abutment with the valve and the pre-loading force of which is in excess of the displacement force required for displacing the valve. Accordingly, the force of the compression spring will have to bridge the entire sealing ring friction of a valve piston, the compressive force of the spring in the secondary pressure space, the force for closing or opening the valves and the required force of displacement for pumping the brake fluid from the actuated secondary pressure space via the said other secondary pressure space to the reservoir to thereby ensure a faultless-operating brake and steer-brake system. By tying the spring to the primary piston, the pre-tension of the spring can be so determined that the valve and secondary pistons are already moved in the event of a minimum movement of the primary piston.

A particularly simple construction of the master cylinder for the purpose of extreme ease of operation and high control precision is attained in that each valve is formed by a longitudinal slide valve having a valve piston displaceable in the bore through the force of the compression spring. A ealing seat in the bore cooperates with the sealing seat of the valve piston, so that the valve piston establishes and separates, respectively, the pressure fluid connection between the two primary pressure spaces. The distance of the sealing seat in the release position of the master cylinder from the associated sealing seat of the valve piston is so dimensioned that the distance covered in the braking operation by the valve piston will not be sufficient to close the sealing seat which is rather attained only upon occurrence of a steer-braking action. Particularly low control travels and, hence, a low volume increase up to the pressure built-up of the secondary pressure spaces are attained in that the travel of the valve piston is defined by the travel of the secondary piston.

Forming the valve piston integrally with the secondary piston will reduce the number of structural units and permit a simple manufaucture of the valve piston.

A slide valve of a particularly simple construction is attained in that an annular groove is coupled to the sealing seat in the bore toward the pedal-sided end of the master cylinder, with the sealing seat extending relative to the circumferential surface of the said annular groove at a small distance therefrom along the valve piston, and in that the valve piston tapers at both sides of the sealing seat. The valve piston is positioned in the continuous bore of the master cylinder. The valve piston comprises a swivel base of simple construction along with the secondary piston. As compared with a conventional tandem master brake cylinder, the master cylinder of the present invention will require only slightly higher structural efforts. The provision of the annular groove in the bore is easy to control so that, a hydraulic steering and braking operation is developed for which substantially the same material and working efforts are required as for two conventional master cylinders.

Excessive surface processing efforts are avoided in that the sealing seat on the valve piston is formed by a sealing ring that is secured in an annular grovve to the valve piston and the radial outer diameter of which in its open position is larger in size than the diameter of the sealing seat of the bore. In order to provide a sealing point of the valve arrangement which is of a permanent and faultless operation, it is advantageous to provide a free space in the direction of operation of the master cylinder on the front radially outward end of the side wall of the radial groove and the sealing ring. The free space can be provided both on the radial groove and on the sealing ring.

This space prevents immersion of the sealing ring in the gap between the bore and the cylindrical surface of the valve piston from occurring as the sealing material is urged radially inwardly and can escape undamaged into the free space.

In order to enable the brake fluid during a steer-braking operation to quickly flow from one of the actuated secondary pressure spaces via the other secondary space and the closure element to the reservoir, it is advantageous to have the closure element formed in the channel between the reservoir and the secondary pressure space, in the secondary piston and to maintain the same by a stop stationary in the housing in the release position of the master cylinder. This central valve will replace the prior art breather bore construction on master cylinders, hence, permitting a higher flow rate as a result of a larger channel cross-section.

In the event that the cost of the described valve arrangement becomes too great, an alternative valve arrangement may be used in which the sealing seat is formed by the opening of the channel that opens into the bore and that is connected to the primary pressure space via a pressure medium line disposed externally of the bore in a manner that the sealing seat of the valve piston is always in abutment with the bore, forming the valve arrangement with the sealing seat.

In a two-circuit brake and steering-brake assembly of the type in which in the event of a pressure failure of a brake circuit, another brake circuit is available for applying brakes to a vehicle, a third piston may be formed in the bore of each master cylinder between the primary piston and the valve arrangement. The third piston has one end which with the primary piston forms the primary pressure space and with the other end thereof and the valve arrangement forms a third pressure space. The third pressure space, in the release position, via a channel closeable upon actuation of the third piston by another closure member, is connected to the reservoir. On the pedal-sided end of the valve arrangement, a closure piston is provided which is sealed toward the valve piston in the bore which protrudes into the third pressure space to establish both in the release and in the braking position a pressure medium connection among the third pressure chambers. In the steering-brake position the piston will seal in a pressure-tight manner the connection of the associated third pressure space to the third pressure space of said other master cylinder, wherein the third pressure spaces are connected to another pressure circuit of brakes, and wherein the primary pressure chamber, via a pressure lead, is connected to the valve piston.

In order to cause the closing and valve piston to be displaced upon the least movement of the primary piston, a compression spring tied to the third piston is formed in the third pressure chamber. The compression spring is in abutment with the closing piston and the spring pre-loading force is in excess of the displacement force required for displacing the closing and valve piston. This measure is of a special advantage, as the valve and closing pistons must have reached the required postion before a pressure can be built up in the primary and secondary pressure chambers.

In a black-and-white two-circuit division, wherein the front and rear axles are connected to respectively one brake circuit, it is advantageous that the non-steer-braked brakes are connected to the pressure lead interconnecting the two third pressure chambers. However, brake circuit divisions other than the afore-described ones, are possible, such as e.g. the connection of the third pressure chambers to another rear axle brake circuit so as to provide one steer-braked and one non-steer-braked brake cylinder on each brake disc of a rear wheel.

In order that the non-steer-braked brake circuit be turned off during a steer-brake operation and always remain pressure-free, is it worthwhile for the closing piston to form with one sealing face another longitudinal slide valve in the bore. The slide valve is moved upon actuation through the force of the compression springs thereby separating the third pressure chambers from one another. The separation sets the distance of the sealing face in the release position of the master cylinder from the associated sealing surface of the closing piston so that the distance covered by the closing piston upon a braking action will not suffice to close the sealing face. The sealing face is closed only after a steer-brake action has been performed.

The control precision with a steer-brake operation will, while simultaneously reducing the number of structural components, still be increased in that the closing piston is integrally formed with the valve and secondary pistons.

A particulary satisfactory feature is attained in that the sealing of the closing piston coupled to the sealing surface in the bore toward the pedal-sided end of the master through an annular groove relative to the circumferential surface of which extends at a small distance therefrom the sealing surface on the closing piston, and that the closing piston tapers at both sides of the sealing surface. The annular groove thus forms an overflow channel with the closing piston, the cross-section of which is sufficiently large to supply the front wheel brakes with adequate amounts of pressure fluid.

The sealing surface on the closing piston is formed of a sealing ring which, in a radial groove, is secured to the closing piston, the radial outer diameter of which, in its open valve position, exceeds the diameter of the sealing surface of the bore.

The outer diameter of the sealing ring must be so dimensioned as to safeguard a perfect immersion of the closing piston into the bore under a sealing ring friction as low as possible. In order that the wear of the sealing ring assembly on the closing piston be kept as low as possible, a free space is provided between the radial groove and the sealing ring of the closing piston, which is located in the direction of operation of the master cylinder at the front, radially outward section of the radial groove.

BRIEF DESCRIPTION OF THE DRAWING

Referring to the drawing, a plurality of examples of embodiment of the invention have been graphically illustrated and will now be described in greater detail, wherein.

DETAILED DESCRIPTION

Figure 1:
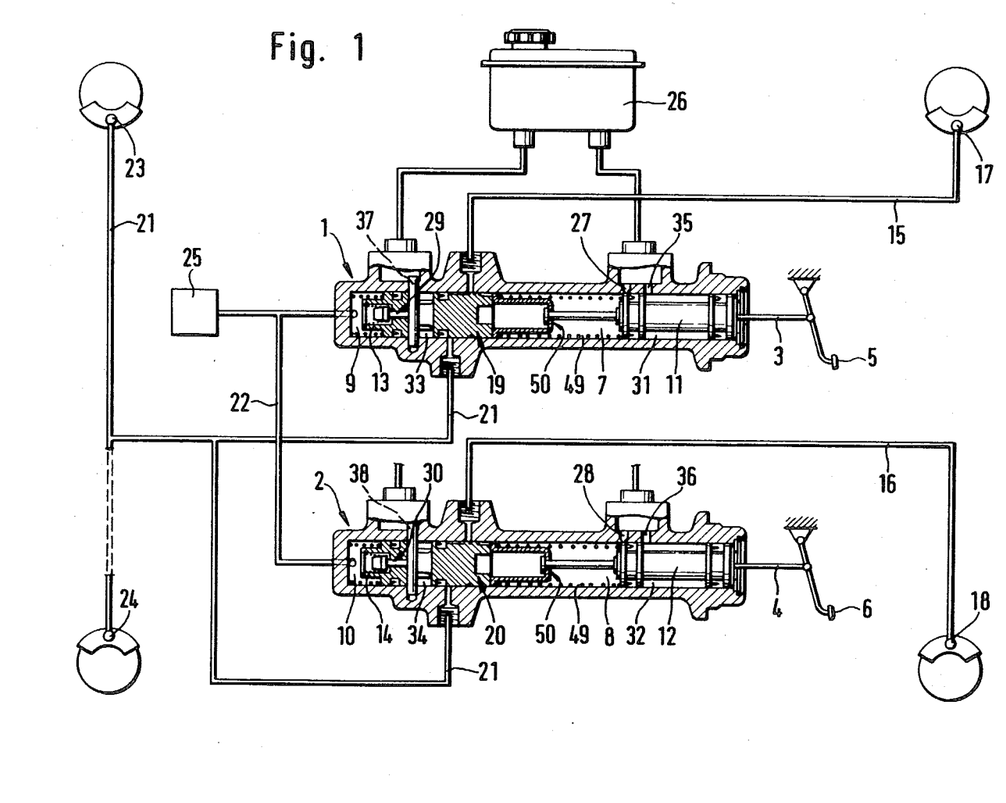
FIG. 1 is a diagram of a hydraulic brake and steering-brake arrangement for use with vehicles in a brake circuit.

The diagram of a brake and steering brake assembly as shown in FIG. 1 of the drawing illustrates a right-hand master cylinder 1 and a left-hand master cylinder 2, with each master cylinder 1 and 2 via a righthand or lefthand brake linkage 3 and 4 being connected to a right and left brake pedal 5 and 6, respectively. Both brake pedals 5 and 6 are seated in side-by-side relationship on a common axis (not shown) and, for the purpose of a braking action may be operated jointly and, for the purpose of a steer-brake operation, may be operated individually.

Both master cylinders 1 and 2 comprise a respective primary pressure chamber 7 and 8 and a respective secondary pressure chamber 9 and 10. One primary piston 11 or 12 is connected to the associated brake linkage 3 or 4 to act upon the two primary pressure chambers 7 or 8, whereas one secondary piston 13 or 14 will act upon the two secondary pressure chambers 9 and 10. Each primary pressure chamber 7 and 8 via a righthand and lefthand pressure medium line 15 and 16 respectively, is connected to a righthand and lefthand rear wheel steer-braked brake 17 and 18, respectively. The primary pressure chambers 7 and 8 in the release position of the master cylinders 1 and 2, moreover, are interconnected via the respective valve assemblies 19 and 20 and the pressure fluid line 21. The two secondary pressure chambers 9 and 10 are in permanent communication via an equalizing line 22. Connected to the pressure fluid line 21 are the righthand and lefthand non-steer braked front wheel brakes 23 and 24, whereas connected to the equalizing line 22 is the trailer brake valve 25 adapted for connection to a trailer. The volume adopted by such a trailer brake valve 25 is not in excess of 1.5 cm³ brake fluid.

In the release position of the master cylinders 1 and 2 the pressure chamber 7 and the pressure chamber 8 are each connected to a common chamber of an equalizing reservoir 26 by way of channels 27, 28 and individual hydraulic lines, only a portion of one being shown, extending between the channels 27, 28 to the equalizing reservoir, thereby interconnecting the chambers 7 and 8 in the release position. Similarly the intake chamber 31 and the intake chamber 32 are each connected to the same common chamber of the equalizing reservoir as the chamber 7 and 8 by way of the channels 35 and 36 and the hydraulic lines and are therefore also interconnected in the released position.

The secondary pressure chamber 9 and the secondary pressure chamber 10 are each connected to a common second chamber of the equalizing reservoir 26 by way of closing members 29, 30, intake chambers 35, 36, channels 37, 38 and individual hydraulic lines, also only a portion of one being shown, which extend between the channels 37, 38 and the second chamber of the equalizing reservoir 26, thereby interconnecting the secondary pressure chambers in the released position.

Figure 2:
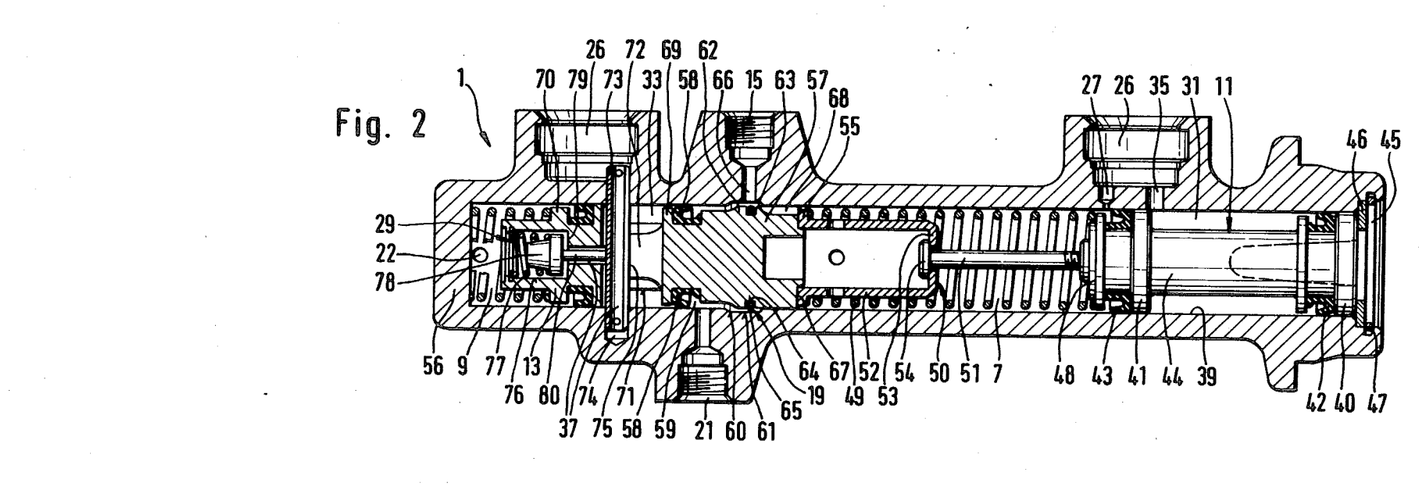
FIG. 2 is a longitudinal section through the upper master cylinder of FIG. 1, in enlarged scale.

Master cylinder 1 as shown in longitudinal section in FIG. 2 of the drawing, for illustrative purposes is demonstrated in enlarged scale. In accordance with the master cylinder of FIG. 1, identical reference numerals have been used for identical parts in FIG. 2. To avoid repetitions, reference is, therefore, made only to parts that have not as yet been referred to or described with reference to FIG. 1.

The two pistons 11 and 13 are guided in bore 39 of the master cylinder 1. The primary piston 11 comprises a front and a rear piston head 40 and 41 for receiving respective sealing sleeves 42 and 43 forming the seal closure. The two piston heads 40 and 41 are rigidly interconnected by a cylindrical shaft 44 the outer diameter of which is smaller than the outer diameter of the piston heads 40 and 41. The front piston head 40 at the open end 45 of the bore 39 is in abutment with a housing-stationary stop formed by a disc 46 and a safety ring 47 secured in an expanded shoulder of the bore 39. Formed by bore 39 between the two piston heads 40 and 41, and the cylindrical surface of the shaft 44 is an annular chamber 31 representing the intake chamber. While the sealing sleeve 42 seals the intake chamber 31 against the atmosphere, sealing sleeve 43 upon actuation of the primary piston 11 to be left in the drawing seals the intake chamber 31 against the primary pressure chamber 7 in pressure-tight manner. In the releasing direction of the primary piston 11 prior to passage of the rear sealing sleeve 43 across channel 27, the sealing of sleeve 43 establishes a fluid connection between its radial outer cylindrical surface and the bore of the intake chamber 31 to the primary pressure chamber 7, if a vacuum arises in the primary chamber 7, such as may occur due to brake lining wear. In the releasing position of master cylinder 1, the rear sealing sleeve 43 is disposed between the channel 27 extending crosswise of the longitudinal axis of the master cylinder 1, with the channel 27 connecting the primary pressure chamber 7 to the reservoir 26, with channel 35 connecting the reservoir 26 to the intake chamber 31.

A compression spring 49 extending through the primary pressure chamber 7 is supported on surface 48 of the primary piston 11 at one end of the primary pressure chamber 7. The compression spring on the side opposite face 48 is in abutment with the clamping cap mechanism 50 connected to the primary piston 11. Clamping cap mechanism 50 includes a stay bolt 51 protruding into the primary pressure chamber 7 and being rigidly screwed to the primary piston 11, and a cap sleeve 52 coupled thereto. The sleeve 52 has a hood-shaped cross-section, with base 53 of the sleeve 52 being pierced by the bolt 51 and held by the head 54 of bolt 51 in abutment with base 53. The compression spring 49 is preloaded and movement of sleeve 53 can take place only toward primary piston 11, with compression spring 49 being further compressed due to the axial dimension of the bolt and sleeve. Coupled to base 53 of sleeve 52 is an enclosing cylinder section leading to an annular flange 55 expending radially outwardly, on which flange is supported the other end of the compression spring 49.

Valve piston 57 of the valve assembly 19 extends from abutment with flange 55 toward the closed end 56 of the bore 39. The transition between valve piston 57 and secondary piston 13 is formed by a sealing sleeve 58. This sleeve separates pressure medium line 21 from the intake chamber 33 in the case of pressure applied to pressure line 21. The sleeve also connects the intake chamber 33 to the annular chamber 59 in the event of a vacuum prevailing in the annular chamber 59. The annular chamber 59 is formed by the rear section of the cylindrical surface of the valve piston 57 and the bore 39. At the front end of the annular chamber 59, annular groove 61 is coupled to a cone-shaped expansion chamber 60 toward the pedal end of the master cylinder 1. A small distance ahead of the expansion chamber 60, the diameter of the cylindrical surface of valve piston 57 increases, forming an annular flange 62, the radial outer cylindrical surface 63 of which, in diameter, is only slightly smaller than the diameter of the bore 39. On the cylindrical surface 63 of the annular flange 62 is provided a radial groove 64 into which an O-ring 65 is fitted. Channel 66 connected to the pressure fluid line 15 terminates radially outwardly in the annular groove 61. Annular flange 62 extends to the front end of the valve piston 57, with annular flange 55 of sleeve 52 being in abutment with front face 67 of sleeve 52. Circumferentially distributed axial grooves 68 extend from the front face 67 along the annular flange 62 on the cylindrical surface 63, which axial grooves 68 terminate shortly ahead of the O-ring 65 at the cylindrical surface 63 of the valve piston 57. The sealing seat of the valve assembly 19 is thereby formed by a cone-shaped expansion 60 and the bore section of bore 39 coupled thereto and extends in the direction of the closed end 56 and also by the O-ring 65 secured to the valve piston 57. The outer diameter of the O-ring 65 in its assembled condition is slightly larger than the diameter of the bore 39 and smaller than the diameter of the cylindrical surface of the annular groove 61. The width of the closed and cylindrical surface of the annular flange 62 is so dimensioned that it extends in the releasing position of the master cylinder 1 within the annular groove 61 thereby establishing a flow-free pressure fluid connection between primary pressure chamber 7 and channel 66 and, via expansion 60 coupled thereto, between annular space 59 and the prssure fluid connection 21.

Connected to valve piston 57 toward closed end 56 is the secondary piston 13. Valve piston 57 and secondary piston 13 are integrally formed. Secondary piston 13 comprises a front piston head 69 and a rear piston head 70. Both piston heads 69 and 70 are interconnected by a shaft 71 the outer diameter of which is smaller than the diameter of both piston heads 69 and 70. Shaft 71 is provided with a longitudinal or diametral slit 72 extending diametrally of the axis of the master cylinder 1. Sleeve 73 traverses bore 39 and elongated slit 72 in a direction diametral to the axis of the master cylinder 1. Sleeve 73 is held in a blind-end bore 74 by frictional resistance. The end of sleeve 73 shown in the drawing to be the upper end, protrudes into the chamber of the equalizing reservoir 26. Sleeve 73 is provided with an axial channel 37 configured in the form of an elongated bore. Formed in the area of bore 39 on sleeve 73 is an aperture 75 directed toward the open end 45 of master cylinder 1. The aperture establishing a pressure fluid connection between reservoir 26 and intake chamber 33 via channel 37. Sleeve 73 can be formed, for example, by a bracket or brace.

Coupled to the diametral slit 72 toward the closed end 56 is a central stepped bore 76 within piston head 70. In this bore there is a closing element 29 in the form of a central valve closeable by a spring 77 in the direction of sleeve 73. The section of stepped bore 76 which in the drawing is the left section and which is of the larger diameter, serves to receive the valve body 78. The sealing face of valve body 78 together with step 79 forms the sealing seat whereas the section of the step bore 76 which in the drawing is the right section and which is of the smaller diameter, is provided with valve plunger 80. In the releasing position of the master cylinder 1, plunger 80 is in abutment with the sleeve 73 and, in that position, lifts off the valve body 78 from the sealing seat of the step 79 thereby establishing a pressure medium connection between the intake chamber 33 and the secondary pressure chamber 9. Closing element 29 in the secondary pressure chamber 9 replaces the generally known breather bore as shown in the primary pressure chamber 7. In the present steering-brake arrangement it is feasible to provide the closing element 29 since as soon as the closing element 29 is closed upon forward movement of the secondary piston 13, the pressure in the secondary pressure chamber 9 immediately rises suddenly during a braking action.

Figure 3:
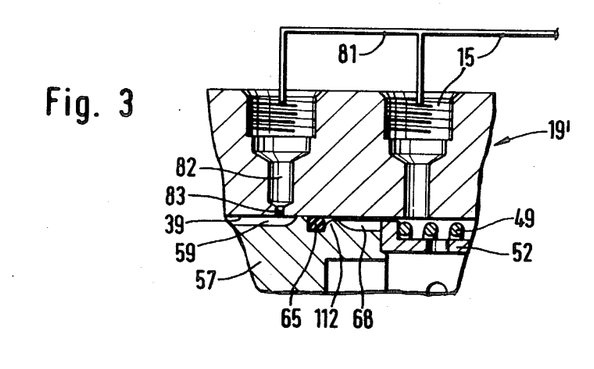
FIG. 3 is a sectional view of another embodiment of the valve arrangement in the master cylinder of FIG. 2.

FIG. 3, of the drawing shows another example of embodiment of the valve arrangement 19'. In accordance with FIGS. 1 and 2, identical reference numerals have been selected for identical parts.

In this embodiment annular groove 61 as shown in FIG. 2 can be eliminated so that bore 39 receiving the primary and secondary pistons 11 and 13 is now formed with only by one diameter. A pressure medium line 81 connected to the pressure medium line 15 is substituted for the annular groove 61 and the annular space 59, (of FIG. 2) which pressure medimum line 81 is connected to the channel 82 radially terminating into bore 39. The termination 83 is formed by a breather bore of small diameter which, in accordance with FIG. 2, terminates leading into the bore 39 at the point where the sealing face is formed with the cone-shaped expansion chamber 60. Hence, during traversing the termination 83 of channel 82 through the O-ring 60, the pressure medium connection between the pressure medium line 21 and the pressure medium line 15 via the pressure medium line 81 is blocked.

Figure 4:
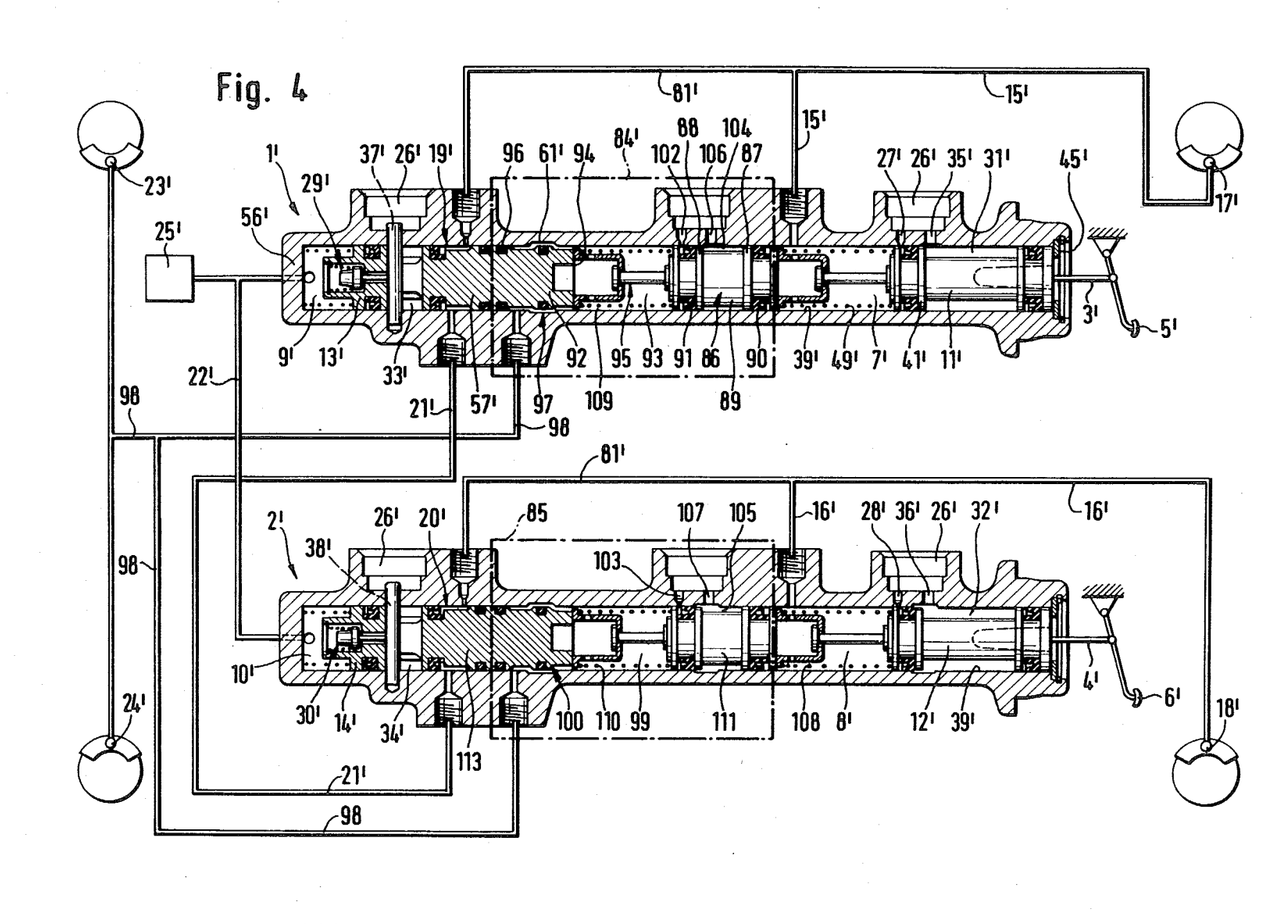
FIG. 4 is a diagram of the hydraulic brake and steering brake system for a system with two brake circuits, this diagram including a longitudinal section through the master cylinder.

The steering brake arrangement as shown in FIG. 4 of the drawing is distinguished from the brake and steering-brake assembly as shown in FIGS. 1 and 2 in that the wheel brakes of a vehicle are controlled by two separate brake pressure circuits in the FIG. 4 embodiment. Accordingly, functionally identical parts are given identical reference numerals provided with a stroke or apostrophe'. FIG. 4 shows a righthand and a lefthand master cylinder 1' and 2', with each master cylinder via a righthand or left hand brake linkage 3' and 4' being connected to a brake pedal 5' and 6'. Both brake pedals 5' and 6' are seated on a common axis (not shown) in side-by-side relationship and, for the purpose of a braking operation can be actuated jointly and for the purpose of a steer-brake can be actuated commonly.

Both master cylinders 1' and 2' are provided with a respective primary pressure space 7' and 8' and a respective secondary pressure space 9' and 10'. The two primary pressure chambers 7' and 8' are respectively acted upon by a primary piston 11' and 12' connected to the associated brake linkage 3' and 4', while the two secondary pressure chambers 9' and 10' are acted upon respectively by a single secondary piston 13' or 14'. Each primary pressure chamber 7' and 8' is connected via a righthand and lefthand pressure medium line 15' and 16', respectively, to a righthand and lefthand rear wheel brake 17' and 18'. In the release position of the master cylinders, the primary pressure chambers 7' and 8', continue to be interconnected via the valve assembly 19' and 20' and the fluid pressure line 21'. The two secondary pressure chambers 9' and 10' are in permanent communication via an equalizing line 22'. Connected to the equalizing line 22' is the trailer brake valve 25' adapted for connection to the brakes of a trailer. Equalizing chamber 26' connected to an equalizing reservoir in the releasing position of the master cylinders 1' and 2', interconnect the primary and the secondary pressure chambers 7' and 8' and 9' and 10' via channels 27' and 28' and closing elements 29' and 30' and connect intake chambers 31', 32' and 33', 34' via channels 35', 36' and 37', 38' with brake fluid.

For the sake of ease, a precise and detailed description of the parts already referred to in the figure description according to FIG. 2 and re-appearing in FIG. 4, will not be made. Only those differences will be described which, as compared with FIGS. 1 to 3, in FIG. 4 are new or modified. In this respect, the description refers to the righthand master cylinder 1' as described in FIG. 4. The pressure fluid line connecting the valve arrangement 19' to the pressure medium line 15' will now be provided with reference numeral 81'.

The element illustrated in the square boxes 84' and 85 shown by dashed lines in FIG. 4 provide another additional brake pressure circuit. The configuration of the master cylinder in the area of boxes 84' and 85, for the sake of a straight forward illustration, will be described only with reference to the master cylinder 1' as shown in FIG. 4.

Provided in the bore 39' is a third piston 86 which with the one end thereof forms the piston head 87, and with the other end thereof forms the piston head 88. The two piston heads 87 and 88 are rigidly interconnected by a cylindrical shaft 89, the outer diameter of which is smaller than the outer diameter of the piston head 87 and 88. The piston head 87 carries on the outer cylindrical surface thereof, in an annular groove, a non-return valve in the form of a sealing sleeve 90 locking in the direction of the closed end 56'. The sleeve 90 together with the rear piston head 41' of the primary piston 11' and the bore 39' forms the primary pressure chamber 7'. The piston head 88 carries on the outer cylindrical surface thereof, in an annular groove a non-return valve in the form of a sealing sleeve 91 opening in the direction of the closed end 56', which together with a closing piston 92 coupled to the valve piston 57', and the bore 39' forms the third pressure chamber 93. Formed between the front end 94 of the closing piston 92 and the end of the third piston 86 is a clamping means 95 substantially corresponding to the clamping means 50 already described in FIG. 2.

Closing piston 92 at the left end thereof is sealed against valve piston 57' in pressure-tight manner by means of a seal 96 cooperating with bore 39'. The section of closing piston 92 protruding from the seal 96 into the third pressure chamber 93, except for one difference, corresponds to valve assembly 19 already described in FIG. 2. The difference resides in that the pressure medium line 15' does not terminate into the annular groove 61' but is rather displaced toward the open end thus terminating into the primary pressure chamber 7'. The third pressure chamber 93 is connected via closing arrangement 97, pressure medium line 98 and closing assembly 100 on the other master cylinder 2' to the third pressure chamber 99 of the said other master cylinder 2'.

Chambers 26' of the respective master cylinders, are connected in the release position of master cylinders 1' and 2' via channels 102 and 103 in the form of breather bores, to the third pressure chambers 93 and 99.

Intake chambers 104 and 105 are connected via respective channels 106 and 107 to chambers 26'. Connected to pressure fluid line 98 are the non-steer-braked brakes, e.g. the front wheel brakes 23' and 24'.

The method of operation of the brake and steer brake system shown in FIG. 1 through 3 is as follows:

When master cylinders 1 and 2 are simultaneously operated by brake pedal 5 and 6—which would correspond to a braking action on the vehicle—the primary pistons 11 and 12 and secondary pistons 13 and 14 connected to valve assemblies 19 and 20 via clamping means 50 will be moved leftward. The movement is continued until channels 27 and 28 and closing members 29 and 30 are closed. No appreciable brake fluid absorbing consumers are connected to the secondary pressure chambers 9 and 10; pressure will now rapidly build up in the said pressure chambers 9 and 10, causing secondary pistons 13, 14 to come to a standstill. The standstill condition of secondary piston 13 and 14 is reached in a position in which valve assemblies 19 and 20 have not yet separated the pressure medium connections 15 from the pressure medium connections 21. Upon a further actuation of the primary pistons 11 and 12 pressure fluid will be supplied to the individual steer-braked wheel brakes 17 and 18 by way of the lines 15, 16 and to the non-steer braked brakes 23, 24 by way of brake line 21 and brake action will be applied to the vehicle. Valve assemblies 19 and 20 ensure a uniform action of wheel brakes 17, 18 and 23, 24. As the trailer brake valve 25 is connected to the two secondary pressure chambers 9 and 10 and as the latter have built up pressure before the primary pressure chambers 7 and 8 have been able to develop a pressure build-up, the present method of operation ensures that prior to initiation of a braking action on the vehicle, trailer brake valve 25 has already initiated a braking action on the trailer. When relieving brake pedals 5 and 6, the brake pressure in the steer-braked brakes 17 and 18 decreases prior to the decrease of pressure in the secondary pressure chambers 9 and 8. Re-intake of brake fluid, for example, on account of brake pad wear on the individual brakes 17, 18 and 23, 24 in respect of the non-steer-braked brakes 23, 24 is effected via intake chamber 33 and sealing sleeve 58 coupled there behind in the re-intake direction, and annular space 59. The steer-braked brake channels 27 and 28 can equally re-intake brake fluid via sealing sleeve 58 or sealing sleeve 43. In the release position of master cylinders 1 and 2 all wheel brakes 17, 18 and 23, 24 only via breather bores 27 and 28 are connected with the reservoir that is under atmospheric pressure.

Upon actuation of only one master cylinder, e.g. the righthand master cylinder 1, which would correspond to a steer brake effect on the righthand side of the vehicle, primary piston 11 is displaced via brake pedal 5 and brake linkage 3, and hence, secondary piston 13 connected to valve arrangement 19 via clamping arrangement 50 is also displaced. After traversing channel 27 and closing member 29 it is not possible for pressure to build up in the secondary pressure chamber 9 as the closing member 30 does not close on the secondary pressure chamber 10 of the master cylinder 2 because the said master cylinder 2 has not been actuated. Pressure medium is now conveyed from the secondary pressure chamber 9 via pressure line 22 and closing member 30 to reservoir 26. As the secondary piston 13 upon further actuation of the primary piston 11 covers a greater distance, the valve arrangement 19 closes and separates the primary pressure chamber 7 from the pressure medium line 21. Upon further actuation of primary piston 11, a hydraulic pressure is built up in primary pressure chamber 7 and pressure medium is supplied to the righthand rear wheel brake 17 via pressure medium conduit 15. A steer brake effect has been performed.

In the event of a defective front axle pressure circuit 21 and/or rear axle pressure circuit 15 and/or 16, pistons 11 and 12 will traverse channels 17 and 28 and close closing members 29 and 30, no pressure can build up in the primary pressure chamber 7 and 8. Due to the force of the compression springs, a low pressure is developed inside the still intact secondary pressure chambers 9 and 10; however, due to the low forces of the compression springs 49, the pressure in chambers 7 and 8 will not suffice to actuate the trailer brake valve 25. The pressure in the secondary pressure chambers 9 and 10 is, however, so high that no further displacement of the secondary pistons 13 and 14 through the compression springs 49 will take place. Hence, valve assemblies 19 and 20 cannot close in consequence of which brake pedals 5 and 6 will have to be depressed, i.e. compression spring 49 will have to be compressed, until primary pistons 11 and 12 via clamping means 50, are frictionally connected to the secondary pistons 13 and 14. It is only then that the force will be high enough to permit the pressure to further rise in the secondary pressure chambers 9 and 10 and to operate the trailer brake valve 25. Braking action will now be applied to the tractor by the trailer.

Also, it will be possible for the force of compression springs 49 to be so dimensioned that the pressure in the secondary pressure chambers 9 and 10 is sufficient to actuate trailer brake valve 25 also in the event of a defective primary pressure circuit 7 and 8. However, with an intact brake assembly, this will envolve the disadvantage of deteriorating efficiency of the master cylinder 1 and 2.

If it is to be safeguarded that in the event of a failure of a brake pressure circuit, the vehicle is still serviceable, i.e. braking action can be continued to be applied thereto, the brake and steer brake arrangement according to FIG. 4 is provided for this purpose. The way of operation during a braking action will be as follows:

Upon actuation of brake pedals 5' and 6' coupled to one another via a pin not shown in the drawing, all pistons 11', 12', 86, 111 and 13', 14' formed in master cylinders 1' and 2' are uniformly displaced as the forces of compression springs 49', 108 and 109, 110 are so dimensioned that upon displacement of the primary pistons 11' and 12' at the same time, pistons 86, 11, 13' and 14' coupled thereto are displaced until the pressure is built up in the associated pressure chambers. It goes without saying that the forces of the compression springs 49' and 108 must be in excess of those of compression springs 109 and 110 as they have to additionally overcome the friction of the third pistons 86 and 110. The forces of the compression springs 109 and 110 are required to be at least so dimensioned that they move pistons 57' and 113 along with the secondary pistons 13' and 14' toward the closed end 56'.

After closing off channels 27', 28' and 102, 103 and closing members 29' and 30', first, a low pressure is built up in the secondary pressure chambers 9' and 10' which is sufficient to prevent secondary pistons 13' and 14' from moving any further despite a further movement of pistons 11', 12' and 86, 111, thereby maintaining valve arrangements 19' 20' and closing arrangements 97 and 100 in their open position so that primary pressure chambers 7' and 8' are connected to one another and to the respective pressure chambers of the steer-braked brakes 17' and 18' and the third pressure chambers 93 and 99 are connected to one another and to the respectively connected pressure chambers of the non-steer-braked brakes 23' and 24'.

Prior to a rise in pressure on the wheel brakes 17', 18', 23' and 24', the pressure in the secondary pressure chambers 9' and 10' will have reached a level which, prior to the brakes of the tractor 17', 18' and 23', 24' becoming operative, has already actuated the trailer brake valve 25 so that it is first the brakes of the trailer that start to operate. Upon a further actuation of the brake pedals 5' and 6' gradually, a uniform pressure will develop on the brake cylinders of the steer and non-steer-braked brakes 17', 18' and 23', 24' so as to attain a uniform braking effect also for the tractor on all braked wheels.

If, for example, a steer-braking action relative to the righthanded vehicle side is to be performed, for this purpose, wheel brakes 17' on the righthand vehicle side will have to be applied, which is done by actuating the righthand brake pedal 5' and the righthand master cylinder 1'. Again, pistons 11', 86', 57 and 13' formed in the master cylinder 1' are uniformly moved forwardly so that upon closure of channels 27 and 102 and closing members 29', first, brake fluid is conveyed from the secondary pressure chamber 9' via the secondary pressure chamber 10' and the closing member 30' to the equalizing reservoir 26' as the closing member 30' owing to the non-operated master cylinder 2' remains opened. Hence, owing to the more extended travel of displacement of the secondary piston 13', valve assembly 19' and closing assembly 97 get into their closing positions so as to close the non-steer braked front wheel brakes 23' and 24' by the third pressure chamber 93, and the pressure fluid connection 21' by the primary pressure chamber 7'. As soon as the secondary piston 13' strikes the bottom of the closed end 56', pressure can build up in the third pressure chamber sealed in pressure-tight manner, i.e. piston 86 will come to a standstill when neglecting expansion of the components to which pressure is applied from the third pressure chamber 93.

Now, pressure develops in the primary pressure chamber 7' so that at the same time, pressure is applied to the pressure fluid chamber of the wheel cylinder of the steer-braked righthand brake 17'; a steer-brake action toward the righthand side of the vehicle takes place.

In the event that a pressure circuit fails during a normal braking operation, the respective brake pedal path, admittedly, increases, however, at least one brake circuit will remain actuatable. If, for example, the brake circuit connected to the primary pressure chamber 7' fails due to a defect, valve arrangements 19 and 19' and the closing arrangements 97 and 100 remain opened and primary pressure chambers 7' and 8' evacuate via the point of leakage until the primary pistons 11' and 12' get into abutment with the third piston 86 and 111 and, upon a further actuation pressure can build up in the third pressure chambers 93 and 99 propagating via closing arrangements 97 and 100 and pressure medium line 98 to the wheel brake cylinders of the non-steer-braked front wheel brakes 23' and 24'. A braking effect will take place on these wheels which is inferior to that of an intact braking system. However, before a braking action taking place on the front wheel brakes 23' and 24', a braking action has already started to become effective on the trailer on account of the switched trailer valve 25' through the pressure prevailing in the secondary pressure chambers 9' and 10'.

In the event that the pressure circuit connected to the third pressure chambers 93 and 99 fails due to defect, valve arrangements 19' and 20' and closing arrangements 97 and 100 equally remain in their open position as the same, owing to the pressure in the secondary pressure chambers 9' and 10' come to a standstill at an early stage. Accordingly, a pressure can build up in the primary pressure chambers 7 and 8 only if the volume of the third pressure chambers 93 and 99 has emerged through the leakage point, and the third pistons 86 and 111 have got into abutment with the secondary pistons 13' and 14'. The pressure in the wheel brake cylinders of the steer-braked brakes 17' and 18' will then rise with a uniform braking action of the vehicle taking place at a decreased performance, though, Before here, too, a braking action taking place on the steer-braked brakes 17' and 18', the trailer has already started the braking action owing to the actuation of the trailer brake valve 25'.

In the event of a circuit failure of the secondary pressure chambers 9' and 10', valve arrangements 19' and 20' and closing arrangements 97 and 100 are closed. The third pressure chambers 93 and 99 are separated from the front wheel brakes 23' and 24'. At the same time, pressure lines 21' and 81' are separated from one another so that no pressure balance between the primary pressure chambers 7' and 8' will any longer take place. The secondary pistons 13' and 14' upon a further actuation migrate to the stop on the closed end 56'. Now pressure will build up in pressure chambers 7, 8' and 93, 99. As pressure chambers 93 and 99 are closed, only steer-braked brakes 17' and 18' are operated. The vehicle will decelerate at a reduced brake effect. Owing to the failure of pressure in the secondary pressure chambers 9' and 10' the brakes of the trailer remain ineffective.

What is claimed is:

1. A hydraulic and steering brake system adapted for use with a vehicle, comprising two master cylinders operable singly or jointly by way of separate brake pedals, in which each said master cylinder includes a primray piston and a secondary piston each slidably disposed in a bore including a primary pressure chamber between said primary piston and said secondary piston and a secondary pressure chamber between said secondary piston and a closed end of the bore, the primary pressure chambers each connected to a first equalizing chamber by way of a first channel between each said primary pressure chamber and said first equalizing chamber and the secondary pressure chamber each connected to a second equalizing chamber by way of a second channel between each said secondary pressure chamber and said second equalizing chamber, means operable upon actuation of the primary and secondary pistons from a release position of the respective master cylinders toward a braking position to disconnect each said primary and secondary pressure chamber from said respective first and second equalizing chamber including a closing member disposed between each of said first and second channels and each of said respective primary and secondary pressure chambers associated with said channels, the secondary pressure chambers interconnected through an equalizing line and the primary pressure chambers are respectively connected to steering-brakeable brakes on wheels at opposite sides of the vehicle, the primary pressure chambers interconnected through a pressure line and valve means associated with each master cylinder for establishing a pressure connection between the primary pressure chambers in the event that the two master cylinders are actuated simultaneously, and for hydraulically separating said primary pressure chambers in the event that only one of the master cylinders is actuated, said valve means for each master cylinder includes a valve member disposed in the bore between the primary and the secondary pistons of the master cylinder, said valve means adapted to be open in both the release position and the braking position, wherein both master cylinder primary pistons occupy substantially an identical relative axial position in said bore of its respective master cylinder, whereby said pressure medium connection of the primary pressure chambers is established therebetween through said valve means and said pressure line, said valve member includes seal means responsive upon actuation of only one if said primary pistons toward the braking position, wherein only one master cylinder is actuated, for sealing off in a pressure-tight manner the pressure medium connection between the primary pressure chamber associated with said master cylinder that is actuated and the primary pressure chamber of the other master cylinder.

2. A hydraulic brake and steering brake system according to claim 1, wherein non-steer-brakeable brakes are adapted to be connected to the presure line between the two primary pressure chambers.

3. A hydraulic brake and steering brake system according to claim 1, wherein a trailer brake valve is connected to the equalizing line interconnecting the two secondary pressure chambers.

4. A hydraulic brake and steering brake system according to claim 1, wherein the primary pressure chamber of each master cylinder includes a compression spring connected to the primary piston, said compression spring being in abutment with the valve member and having a preloading force in excess of a force required to displace the valve member.

5. A hydraulic brake and steering brake system according to claim 4 wherein each said valve member is formed by an elongated slide valve having a valve piston displaceable in the bore between said release position and said braking position, said valve piston including a sealing portion cooperating with a valve sealing seat in the bore, the valve piston extablishing and separating, respectively, the pressure medium connection between the two primary pressure chambers, a distance of the sealing seat in the bore in the released position of the master cylinder from the sealing portion of the valve piston being dimensioned such that the distance covered by the valve piston during a non-steer braking operation is insufficient to close the sealing portion of said valve piston against the sealing seat of said bore, which closure is attained only during a steer braking operation.

6. A hydraulic brake and steering brake system according to claim 5 wherein the valve piston is displaced an amount defined by a distance of travel of the secondary piston.

7. A hydraulic brake and steering brake system according to claim 5, wherein the valve piston is integrally formed with the secondary piston.

8. A hydraulic brake and steering brake system according to claim 5 wherein an annular groove is formed in the bore extending from the sealing seat toward the primary piston, said valve piston tapering radially inwardly along a portion thereof extending from said sealing portion toward said secondary piston.

9. A hydraulic brake and steering brake system according to claim 5 wherein the sealing (seat) portion on the valve piston is formed by a sealing ring secured to the valve piston in a radial groove in the valve piston the sealing ring having a radial outer diameter being in excess of the diameter of the sealing seat of the bore.

10. A hydraulic brake and steering brake system according to claim 9 wherein an annular clearance space is provided between the bore and the valve piston along a portion of said valve piston extending from a front, radially outward section of a sidewall of the annular groove in the bore to a sealing ring on the valve piston.

11. A hydraulic brake and steering brake system according to claim 1 wherein the closing member disposed in the second channel between the second equalizing chamber and the secondary pressure chamber of each master cylinder is disposed in the secondary piston and is held in an open position in the release position of the master cylinder by a stationary stop.

12. A hydraulic brake and steering brake system according to claim 1 wherein said valve means includes an opening into the bore, said opening being connected to the primary pressure chamber via the pressure line disposed externally of the bore, a sealing member on valve member in said bore in constant slidable sealingly abutment with the bore, said opening and said sealing member relatively positioned to close said opening upon actuation of only one of said master cylinders to effect steer braking.

13. A hydraulic brake and steering brake system according to claim 1, wherein a third piston is provided in the bore of each master cylinder between the primary piston and the valve arrangement, one end of said third piston along with the primary piston forming the primary pressure chamber and the other end of said third piston and the valve arrangement forming a third pressure chamber, the third pressure chamber in the release position, being connected to the equalizing chamber by way of a channel adapted to be closed upon actuation of the third piston by another closing member, a closing piston being in abutment with a pedal-sided end of the valve arrangement which closing piston is sealed over the valve piston in the bore which protrudes into the third pressure chamber establishing, in the release position and in the braking position, a pressure fluid connection between the third pressure chambers and closing in a pressure tight manner in the steering brake position the connection between the third pressure chambers of the master cylinders, the third pressure chambers being connected to another pressure circuit of brakes, and the primary pressure chamber by way of a pressure line being connected to the valve piston.

14. A hydraulic brake and steering brake system according to claim 13, wherein a compression spring connected to the third piston is positioned in the third pressure chamber, which compression spring is in abutment with the closing piston, and a preloading force of said compression spring is in excess of a force of displacement required for displacing the closing valve and secondary pistons.

15. A hydraulic brake and steering brake system according to claim 13, wherein non-steer-braked brakes are connected to the pressure line interconnecting the two third pressure chambers.

16. A hydraulic brake and steering brake system according to claim 14 wherein the closing piston with one sealing face in the bore forms an elongated slide valve which upon actuation is moved by the preloading force of the compression springs thereby separating the third pressure chambers from one another, the distance of the sealing face, in the release position of the master cylinder from an associated sealing surface of the closing piston is so dimensioned that the distance covered by the closing piston in a braking action is insufficient to close the slide valve which closure is effected only if a steering brake action takes place.

17. A hydraulic brake and steering brake system according to claim 16, wherein the closing piston is integrally formed with the valve and secondary pistons.

* * * * *